United States Patent [19]

Langen

[11] 3,945,537

[45] Mar. 23, 1976

[54] DISCHARGE DEVICE FOR A BUNKER

[76] Inventor: Peter Langen, 5301 Walberberg, Germany

[22] Filed: July 17, 1975

[21] Appl. No.: 596,591

[30] Foreign Application Priority Data
Feb. 13, 1975   Germany............................. 2506005

[52] U.S. Cl.................. 222/240; 222/317; 222/410
[51] Int. Cl.². ........................................... G01F 11/20
[58] Field of Search ............ 222/410, 55, 239, 240, 222/241, 227, 317; 214/17 D, 17 DA

[56] References Cited
UNITED STATES PATENTS
1,906,664   5/1933   Thorne ............................... 222/240

2,574,231   11/1951   Sinden ............................ 222/410 X

Primary Examiner—Allen N. Knowles
Assistant Examiner—Hadd Lane
Attorney, Agent, or Firm—Parmelee, Miller, Welsh & Kratz

[57] ABSTRACT

A discharge device including a discharge member rotating about a vertical axis, arranged below a conical bunker outlet and above a base plate with a discharge opening, over which member is a fixed cover, said member being a peripherally driven disc having openings separated by bars, the openings being eccentric, the cover extending radially, and an adjusting element for adjusting the height of the edge of the cover over the disc.

17 Claims, 5 Drawing Figures

DISCHARGE DEVICE FOR A BUNKER

The invention relates to a discharge device for a bunker for loose material for material which has poor flow properties and has a tendency to form bridges, especially, lignite. Bunkers of this type are filled discontinuously whereas the material is drawn off continuously or quasi-continuously for further use. In the case of lignite, mills are arranged after the bunker and the coal dust is then discharged from them to fire steam generators.

For an orderly operation of such lignite power plants it is important that the removal of the coal from the bunker is metered in accordance with the requirement of the steam generator. It must therefore be possible to regulate a discharging device of this type. Many loose materials, however, even more or less moist lignite, have extremely poor flow properties. The result is that in the case of unfavourably constructed bunkers or discharging devices bridges form, that is to say, the material comes to a standstill above the discharging device despite the effect of the force of gravity. As a result the discharge is reduced or completely interrupted and the regulation is upset. If this bridge subsequently collapses there is a further disturbance of the discharge regulation but in the opposite sense.

Sometimes the conditions are so unfavourable that the bridges only partially collapse or do not collapse at all. The material lying above exerts a continuous and often extremely substantial pressure on these bridges which can jam the material to such an extent that the bunker finally has to be stopped and released again by knocking out the material by hand.

A discharge device in which these disadvantages are said to be counteracted is described and illustrated in German Auslegeschrift No. 1,275,470. In this case, below a conical bunker outlet there is arranged a crescent-shaped discharge member rotating about a vertical axis, above a plate which has a discharge opening in the centre of rotation. Above the discharge opening, on the central axis of the bunker, is disposed a conical hood of which the diameter at the lower end is greater than that of the discharge opening, and which extends approximately up to the top of the discharge member. The material introduced into the bunker rests above the working range of the discharge member, on the base plate. The material, which slopes inwards between the lower edge of the hood and the base plate is taken along by the discharge member. Since the angle of slope depends on the properties of the material, for example, its moisture content, a scraper device provided with its own drive is arranged inside the hood, by means of which the angle of slope is to be levelled. The drive means of the discharge member is, on the other hand, arranged below the base plate of the bunker, and is itself controlled to control the quantity of material discharged.

Disadvantages of this device are poor access to the inside of the hood: the hood is surrounded by loose material so that maintenance or repairs leads to problems. A further disadvantage is that the space below the bunker base plate, where it is desirable to arrange a belt conveyor, is at least partially taken up by the drive means for the discharge member.

In addition, such a discharge device is suitable only for relatively large bunkers, because the hood with the devices arranged in it cannot be made smaller than a certain size.

An object of the invention is to provide a discharge device of the kind initially mentioned in which such disadvantages are avoided, that is, the important parts are easily accessible for maintenance and the space below the base plate is unoccupied; the device shall also be equally suitable for very large and for very small bunkers.

In accordance with the invention, a discharge device comprising a discharge member rotating about a vertical axis arranged below a conical bunker outlet and above a base plate having at least one discharge opening, and above the discharge opening there is provided a fixed cover over the discharge member, which device is characterised in that the discharge member is a centrally mounted discharge disc driven at its periphery projecting horizontally beyond the lower bunker-outlet-rim and having openings separated from each other by bars, and in that each discharge opening is arranged eccentrically in the base plate and its cover extends radially from the bunker outlet wall in the direction of the vertical axis and has adjusting means operable from the outside, for adjusting the height above the disc surface of that edge of the cover below which the disc first passes when it revolves.

It can be seen that in the device of the invention the centre below the bunker base remains free, since the drive of the discharge member is effected at the side, and that also the adjusting means, for regulating the height of the gap through which the material is tangentially conveyed to the discharge openings, are easily accessible from the outside. This has the additional advantage that regulation usually provided does not have to be effected by means of the speed of the discharge member, although this is also possible in principle, but that the said adjusting means can be acted upon. The speed of the discharge member, can only be adjusted slowly because of the relatively large moving mass, whereas the adjusting means can react much more quickly.

The arrangement can also be so designed that a second base plate is arranged below the bunker base and this is provided with its own disc as discharge member. The upper bunker base plate has a plurality of discharge openings which are distributed over the total circumference whereas the lower plate has only one or two openings in alignment with an underlying conveyor belt. The metering is in this case effected by the upper disc whilst the lower disc acts as an intermediate conveying means. There may be a common drive for the two discs, however, the drive motor engaging on the periphery of the lower disc.

Two forms of discharge device constructed in accordance with the invention will now be described, by way of example, with reference to the accompanying drawings, in which.

Figure 1:
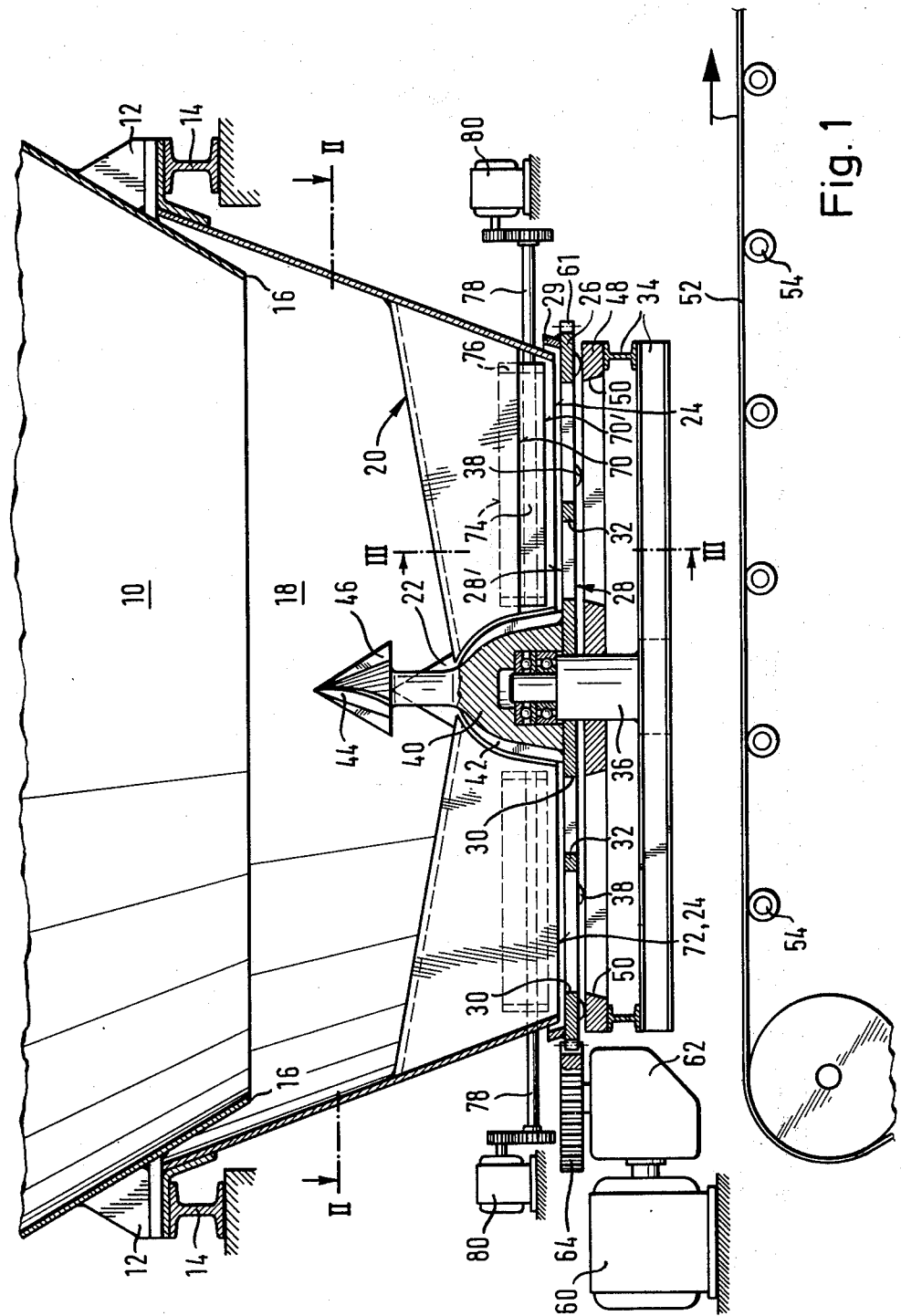
FIG. 1 is a schematic illustration of an axial section through a first form of device according to the invention.

Referring to FIG. 1, the outlet 10 of a conical bunker rests by means of lugs 12 or the like on a frame 14 (not illustrated in detail). Inwardly projecting edges 16 may be seen above the actual bunker outlet which serve to relieve the border region in the outlet to some extent of the weight of the loose material stored in the bunker. In the conical section 18 below, cover means 20 and guide arrangements 22, described in detail hereinafter, are built, or preferably welded in.

The lower edge 24 of the section 18 meets the outer ring 26 of the discharge member 28, which in this region can, if desired, have an upstanding flange so as to form a labyrinth seal.

The discharge member is a substantially flat disc with numerous openings 30, between which there are only narrow bars 32. The shape of the openings is so selected that when the disc revolves, the edges of the bars convey more material in the tangential direction at the outer edges than further in, corresponding to the conical shape of the bunker or of the bunker outlet. For, since it is desirable to achieve as uniform as possible a descent of the level of loose material in the bunker over the total cross-section — different speeds introduce the danger of bridge formation — more material has to be discharged at the outer edge than close to the middle. The curvature of the bar contours is designed accordingly.

Disposed below the discharge member 28 is the bunker base plate on which the disc rests by means of cams 38. These cams are secured to the underside of the disc (preferably welded on) in such a manner that the base plate is "swept free" successively by the cams and no sediment or any other adhering crust of material can be deposited.

The disc is centrally mounted on a large pin 36 which is welded to the base support construction (girders 34) and is sealed from the revolving parts of the discharge member for the protection of roller bearings for the discharge member. The disc is mounted by means of its hub 40 which sits over the pin 36 and has, on its outside, spiral projections 42 and/or cones 44 with or without blades 46. The configuration of the hub and the elements associated therewith depends on the type of loose material. Spirals or blades, when they revolve together with the hub, convey material downwards and to the outside. Although as a result the material is loosened and caking together is counteracted, the action can be so great that the loose material flows more slowly outside the operating range of these elements and there is therefore a danger of bridge formation in the peripheral region of the outlet.

Once the type of material to be conveyed is chosen — for example lignite or cement — it is easy for the expert to determine the most suitable configuration for the hub by means of a few tests. In the case of lignite it has proved particularly advantageous, for example, to arrange a cone, provided with spiral projections, on the upper side of the hub and to provide a reduction gear between hub and cone so that the cone rotates considerably more slowly than the hub with the disc.

The bunker base plate 48 in this embodiment has only two discharge openings 50 which are essentially the shape of a sector of a circle and are diametrically opposite each other. The base plate 48 is supported in the middle and beyond the openings 50 by girders 34, which in turn rest on a framework construction (not shown). Below the openings 50 runs the upper track of a conveyor belt 52 which is supported in the region of the discharge openings by a plurality of rollers 54; the design of the conveyor belt itself does not form a part of the present invention.

The entire drive is effected at the outer circumference of the disc which for this purpose has spur-gear toothing 61. A geared motor 60 drives via a reduction gear 62 a pinion 64 which meshes with the toothing 61. The speed of the motor 60 can be selected so that the desired quantity of loose material is discharged at an approximately central position of the adjusting means to be described hereinafter. Fine adjustment is then effected by means of these adjusting means.

Figure 3:
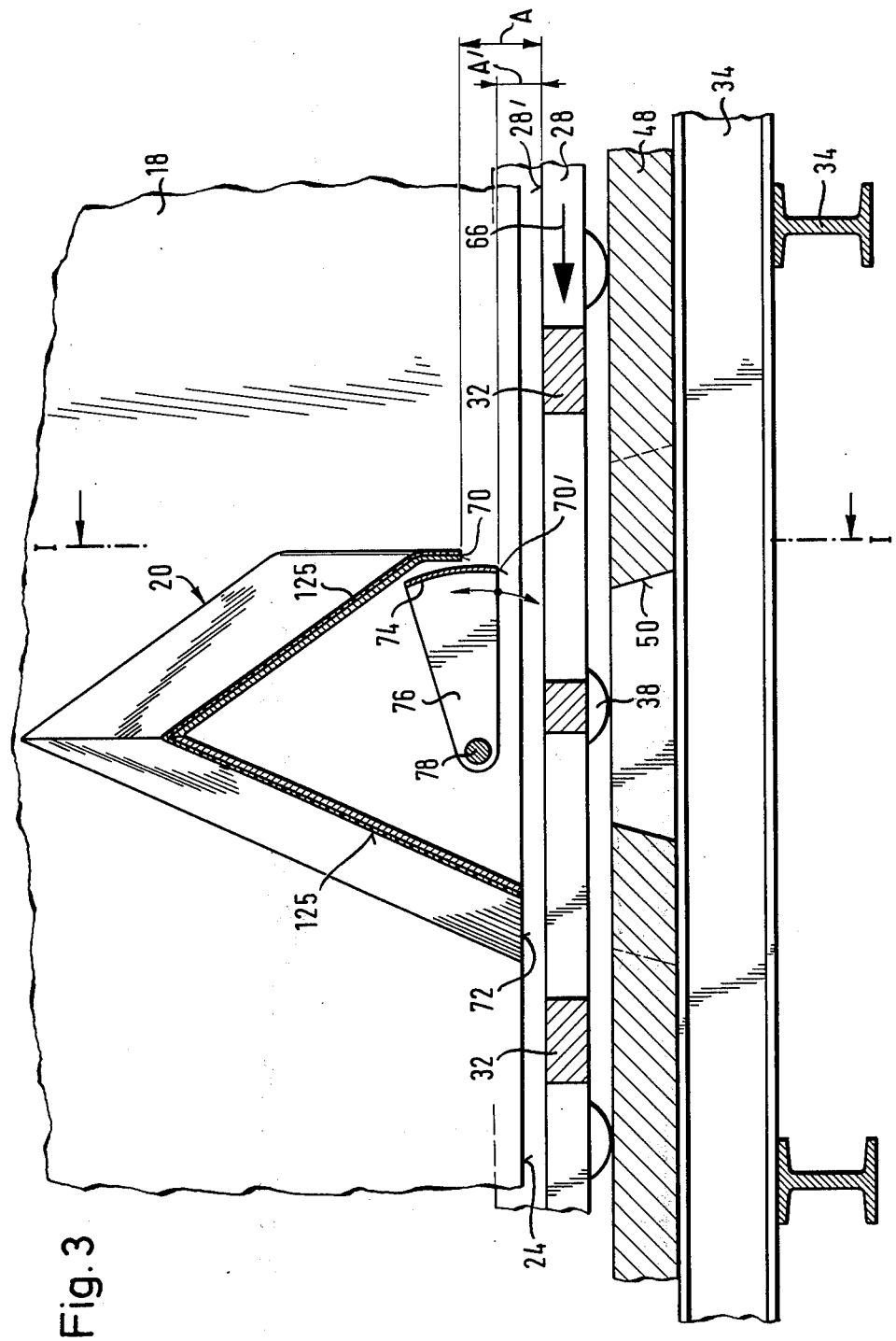
FIG. 3 is a section along the line 3—3 of FIG. 1.

FIG. 3 shows the structure of these adjusting means. The cover means 20 are hollow and are substantially the shape of a ridged roof. The edge 70 below which the disc 28 passes first (arrow 66) does not close flush with the surface of the disc but leaves a relatively large gap, whereas the edge 72, which comes afterwards in the direction of rotation, extends down to the disc. Arranged inside the cover means, directly behind the edge 70 is adjusting means in the form of a slider member 74 which extends radially over the entire length of the cover means and which is adjustable in height. In the embodiment the slider member 74 is for this purpose arranged at the free end of a lever 76 which is in turn joined to a shaft 78. This shaft extends parallel to the edge 70 close to the lower edge 72 and passes through the wall of the bunker outlet. Swivelling the shaft 78 lifts or lowers the slider member 74 and thus increases or reduces the distance between the bunker base plate and the lower edge of the slider member. The greater the gap there between, the more material is discharged from the device while the disc is rotating at constant speed. The slider member could if desired be linearly movable. In any case, its drive means (motor 80 in FIG. 1), is connected to a control or regulating system by means of which the position of the slider member can be adapted to the requirements of the parts of the plant connected thereto.

The guide arrangements 22 are constructed in a similar manner to the cover means 20 but do not have any slider members. If desired, they do not need to extend as far as the hub of the discharge member. They serve to render uniform the flow of the loose material. The roof incline of the cover means 20 and of the guide arrangements 22 is to be selected so that the angle to the horizontal is greater than the angle of slope of the material disposed in the bunker so that it is not possible for bridges to form over parts thereof. Generally an angle of approximately 70° is sufficient, even for difficult cases for example, (wet lignite dust).

Figure 2:
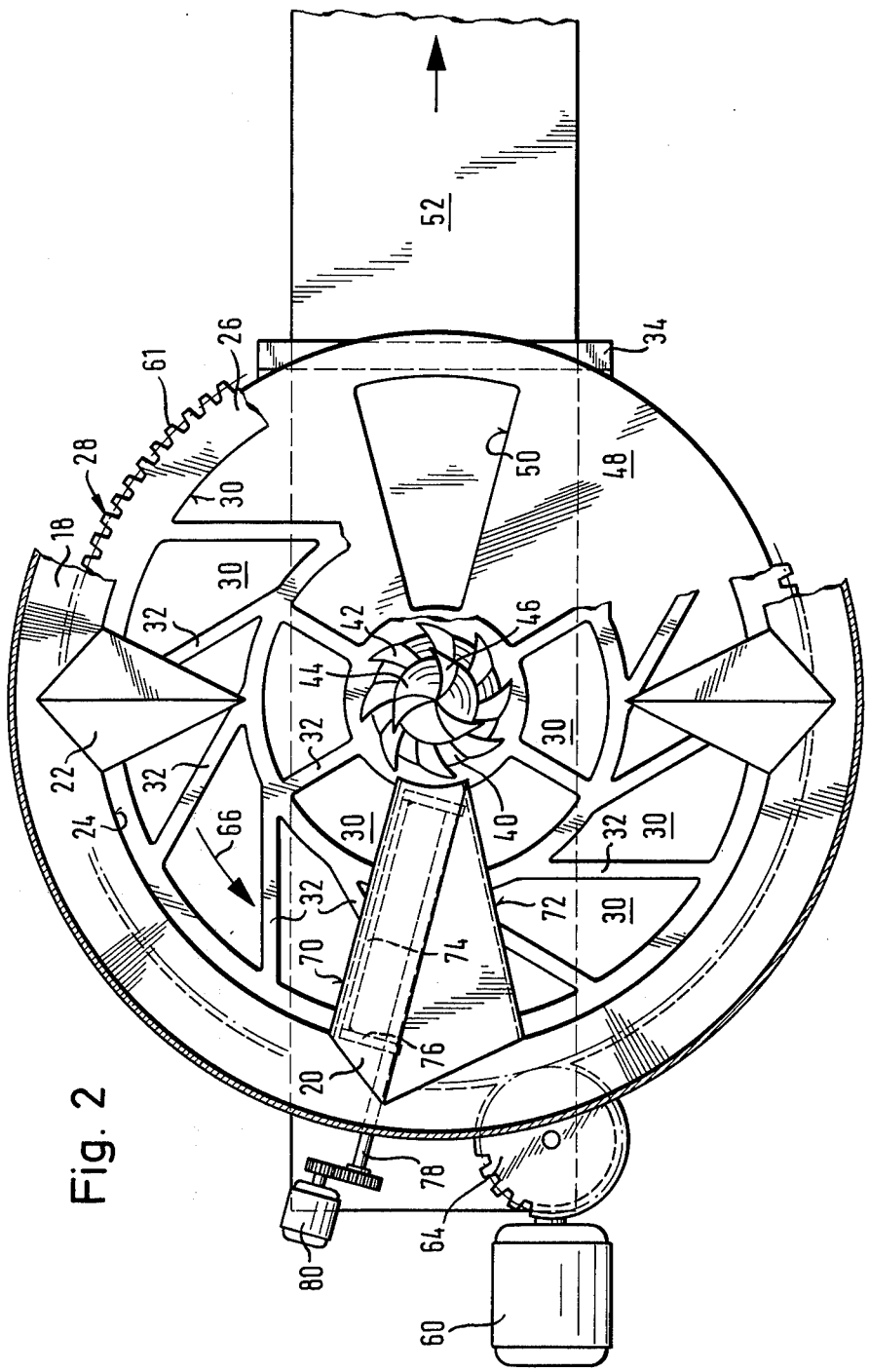
FIG. 2 is a top plan view taken along the lines 2—2 of FIG. 1 and partially broken away.
Figure 4:
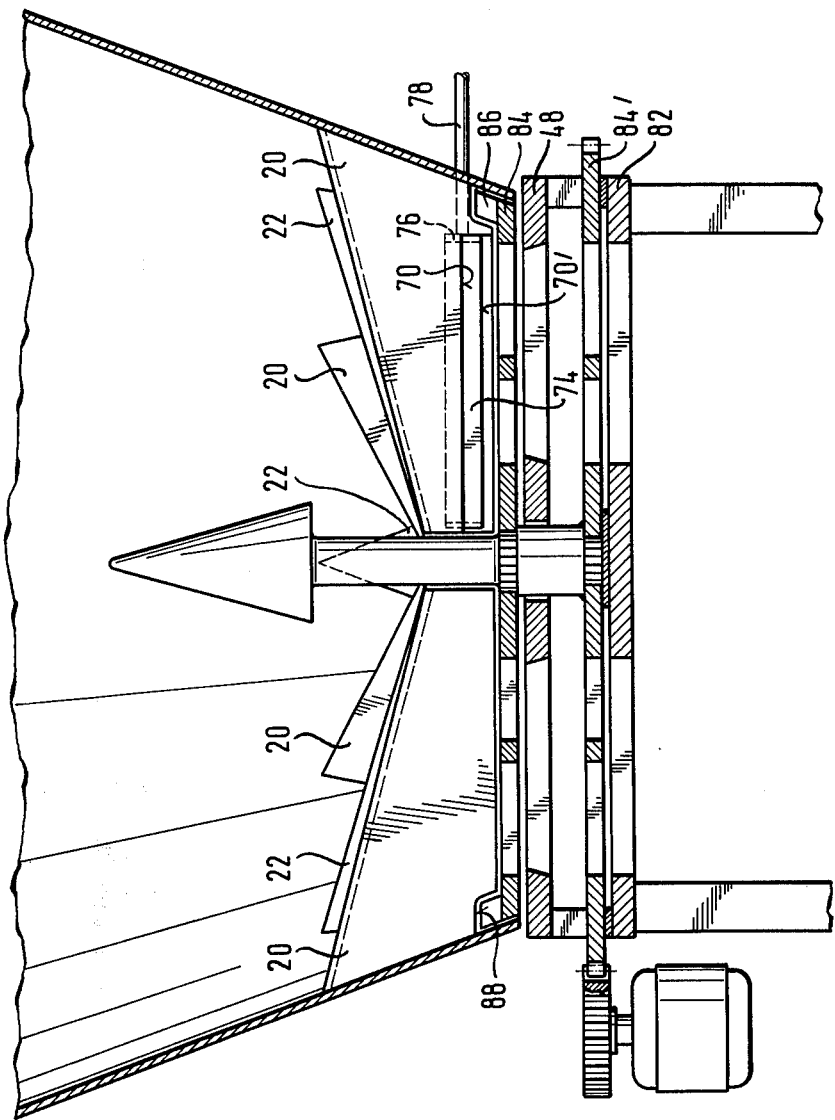
FIG. 4 shows in a view similar to that in FIG. 1 a section through a second form of device according to the invention.

In the second form device shown in FIG. 4, instead of there being two discharge opening cover means and guide arrangements as in FIGS. 1 to 3, there are six of each of these elements, uniformly arranged around the circumference of the discharge member. As a result the area over which material is withdrawn is tripled and consequently the charge of the discharge means is rendered homogeneous. Disposed below the bunker base plate is a further intermediate base plate 82 which has only one or two discharge openings. The discharge member is in the form of a double disc 84-84' which has a common drive at the outer circumference of the lower disc 84. Whilst the above arrangement conveys the material in metered form onto the intermediate base plate 82, it is finally discharged from there by means of the disc 84'. To ensure that no material can become deposited at the outermost periphery of the bunker outlet, the upper disc 84 has extensions 86 fitted snugly inside the bunker outlet which run along the wall of the outlet; the covers and guide arrangements have corresponding recesses 88 through which the extensions 86 pass.

Figure 5:
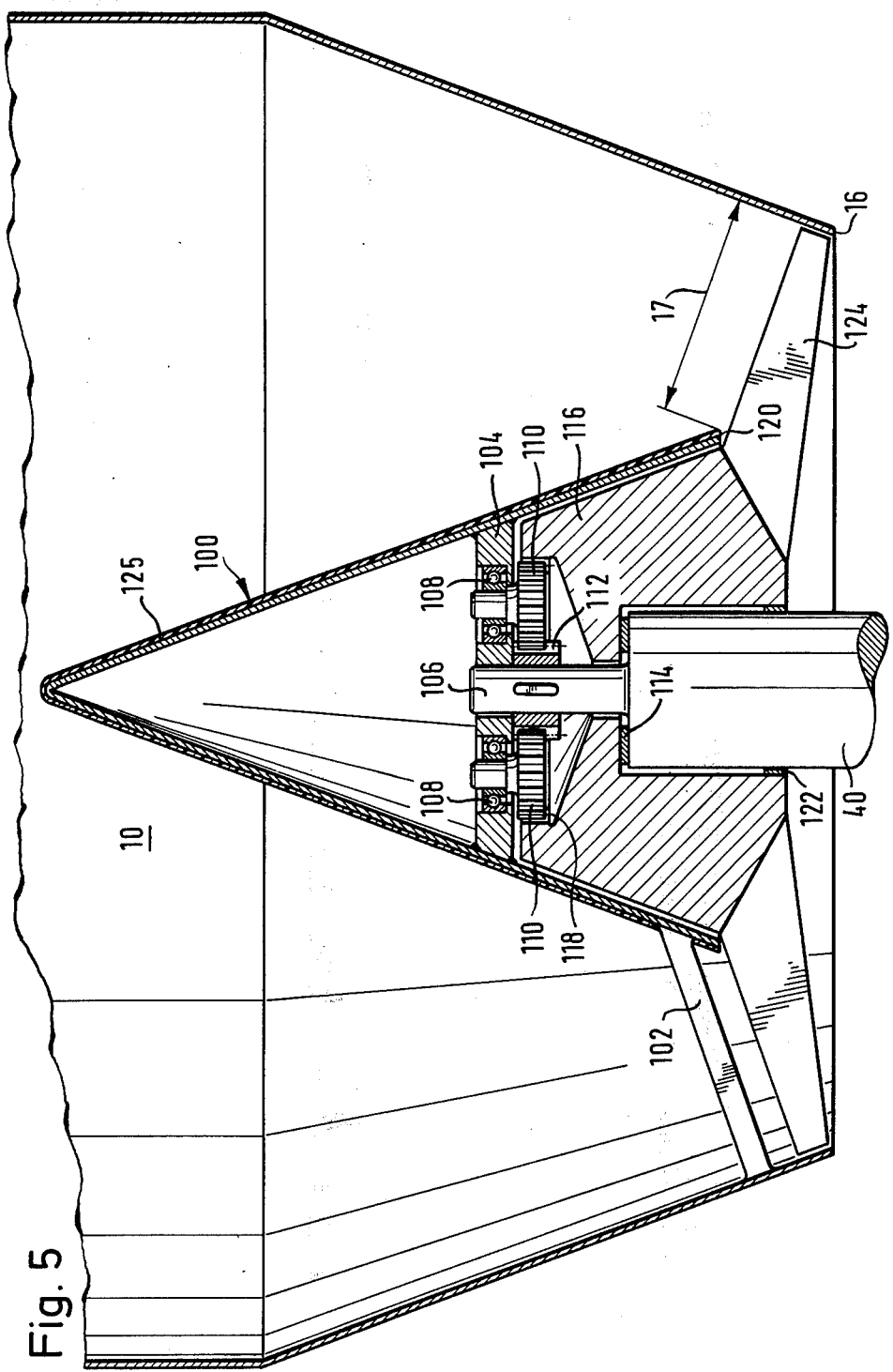
FIG. 5 shows an alternative arrangement for the upper sections of the devices.

FIG. 5 finally shows an alternative arrangement in the upper section of the discharge devices; the figure shows the part of the devices above the cover means 20; for the remainder the arrangement can correspond to that of the embodiment of FIGS. 1 to 3 or to that of FIG. 4.

The hub 40 is extended upwards beyond the upper side of the rim 16 and above this rim there is fixedly installed in the bunker outlet 10 a sheet metal cone 100; the installation is effected, for example, by means of three supports 102 which are uniformly distributed round the circumference and join the cone to the wall of the bunker outlet. Disposed inside the cone 100 is a bearing plate 104 with a central opening, in which there is disposed a bearing pin 106 of the hub 40, and with bearings 108 for pinions 110 which bearings are uniformly distributed round the circumference. In the drawing, two bearings 108 and two pinions 110 can be seen. All the pinions mesh with a pivot pinion 112 which is keyed to the hub 40 or joined to it in some other manner. Disposed on the hub 40 there is a shoulder 114 which acts as an end journal bearing for an auxiliary member 116. This auxiliary member is in the form of a partially conical sleeve with an inner toothed rim 118 at its upper free end and with blades 124, which are uniformly distributed about the circumference, at the lower end; the blades 124 extend radially from the lower edge 120 of the cone 100 to the lower edge 16 of the bunker outlet 10. A support bearing 122 can be provided in a radial direction between the sleeve 116 and the hub 40.

Accordingly a planetary gear is provided between the hub 40 and the sleeve 116, by means of which the sleeve and also the blades 124 are rotated, but at a substantially lower speed than the speed of the hub 40. The material in the gap between bunker outlet 10 and cone 100, which should, to a certain extent have the tendency to dam up and form a bridge at the narrow point between the edge 120 and the edge 16, is removed continuously by the rotation of the blades 124 and thus passes downwards to the actual discharge member.

The surfaces of the cover means 20 the grinding arrangements 22 and of the cone 100 facing the material may be coated with a smooth material, for example plastics, to reduce the coefficients of friction.

I claim:

1. A discharge device for a loose material bunker for material which has poor flow properties and has a tendency to form bridges, comprising a discharge for arrangement below a conical bunker outlet, the discharge member being rotatable about a vertical axis and being arranged above a base plate having at least one discharge opening, and above the discharge opening fixed cover means is provided, characterised in that the discharge member includes at least one centrally mounted discharge disc driven at its periphery which projects horizontally beyond the lower rim of the bunker outlet and having openings separated from each other by bars, and in that each discharge opening is arranged eccentrically in the base plate and its cover means extends radially from the bunker outlet wall in the direction of the vertical axis and has adjusting means, operable from the outside, for adjusting the height above the disc surface of that edge of the cover means below which the disc first passes when it revolves.

2. A discharge device as claimed in claim 1, in which there is provided at least two discharge openings with associated cover means, which discharge openings are diametrically opposite to each other.

3. A discharge device as claimed in claim 2, in which there is an even number, greater than two, of discharge openings, a second base plate is provided under the first base plate and having at least one discharge opening, and a second disc revolving together with the first is provided for discharging the material, which has been conveyed by the first disc through the upper base plate, through the discharge openings of the second base plate.

4. A discharge device as claimed in claim 3, in which there is a common drive means for the two discs at the outer periphery of the lower disc.

5. A discharge device as claimed in claim 3 in which between cover means following each other in the circumferential direction in each case a guide arrangement projects radially into the inside of the bunker.

6. A discharge device as claimed in claim 3, in which the inner ends of the cover means are joined together.

7. A discharge device as claimed in claim 1, in which each cover means is in the form of a roof with a discharge slope which extends almost down to the disc, and a feeder slope which only extends as far as the maximum desired height above the disc, and that the adjusting means comprises a slider member arranged inside the cover means which is vertically movable behind the lower edge of the feeder slope.

8. A discharge device as claimed in claim 7, in which the slider member is arranged on the end of a lever, the lever being pivotable about a horizontal shaft which is arranged close to the discharge slope and extends beyond the bunker outlet.

9. A discharge device as claimed in claim 1, in which the disc carries a central shaft for projection vertically into the interior of the bunker.

10. A discharge device as claimed in claim 9, in which the shaft is provided with blades, one or more points and/or a spiral.

11. A discharge device as claimed in claim 9, in which the shaft and the parts joined to it, and the disc have a common drive means.

12. A discharge device as claimed in claim 9, in which the shaft is rotatable by the disc, but at a speed that is different from that of the disc.

13. A discharge device as claimed in claim 9, in which the shaft is mounted at its free end in the inside of a cone securely arranged in the bunker outlet, and is in rotating connecting with rotating blades which stroke over the annular gap between the lower edge of the cone and the outer wall of the bunker outlet.

14. A discharge device as claimed in claim 13, in which the blades are driven at a substantially lower speed than the disc with the shaft.

15. A discharge device as claimed in claim 1, in which the disc has cams on its lower side for continuously scraping free the base plate.

16. A discharge device as claimed in claim 1, in which the disc has upstanding projections, passing behind the covers, on its outer circumference.

17. A discharge device as claimed in claim 1, in which the surfaces of the cover and of the cone facing the material are coated with a smooth material, for example, plastics, to reduce the coefficients of friction.

* * * * *